Patented Aug. 29, 1950

2,520,255

UNITED STATES PATENT OFFICE 2,520,255

GLUCURONIC ACID SYNTHESIS

Earl A. Peterman, Detroit, Mich.

No Drawing. Application November 17, 1945,
Serial No. 629,315

14 Claims. (Cl. 260—333)

The present invention relates to glucose compounds and methods of making the same, and particularly to methods of synthesizing glucuronic acid and edible salts or compounds thereof.

It has long been known that glucuronic acid is formed from stored glycogen by the liver of animals, including man, and that it is used to neutralize a wide variety of poisons which form in or find their way into the body. Since this reaction constitutes part of the sugar metabolism of the body, research workers in that field have long sought a satisfactory source of glucuronic acid. However, the amounts of glucuronic acid which can be extracted from glucuronic acid compounds in natural substances is very small and the extraction process exceedingly difficult to perform. Neither pure glucuronic acid nor water soluble glucuronates have been synthesized, although water insoluble compounds have been obtained. (Much of the work in this field is outlined in the publication "Electrolytic Preparation of Glucuronic Acid From Glucose" by Leutgoeb, published in 1938 by the Marquette University Press, Milwaukee, Wisconsin.)

In order to synthesize glucuronic acid, it is necessary to oxidize the free primary alcohol (hydroxyl) group on a glucose molecule without breaking the molecule or oxidizing the aldehyde group. For many years, it has been known that this selective oxidization can be accomplished by coupling the glucose molecule at its aldehyde end with a substance which will protect it from oxidization. After the resulting compound has been oxidized, the coupled substance is removed and a glucuronic acid compound extracted. This method has been carried out in the past by combining glucose with methyl alcohol to form methyl glucoside. The glucoside was then oxidized by electrolysis or hydrogen peroxide to produce methyl glucuronide. If the methyl glucuronide had been pure at that stage of the process, it would have been a simple matter to produce glucuronic acid by hydrolyzing the glucuronide and driving off the methyl alcohol. However, in the prior processes, the yield of methyl glucuronide was exceedingly low and the impurities prevented subsequent isolation of pure glucuronic acid. Consequently, the only methods which have been employed involve neutralization of the glucuronic acid following hydrolysis by an alkaloid (brucine or cinchonine) to produce a water insoluble compound rather than pure glucuronic acid. These compounds have no value except as laboratory curiosities.

Cellulose, which is a polymer of glucose, has been oxidized by numerous substances for the purpose of rendering it soluble in water. Since the polymerized glucose molecules are coupled at their aldehyde ends, such processes probably produce polyuronic acids; but no attempt has been made to produce glucuronic acid from such materials.

It is the general object of the present invention to provide relatively simple and practical processes for the production of pure crystalline glucuronic acid or edible salts or compounds thereof, in substantial quantities from glucose or any glucose compound having a free primary alcohol group.

Another object of the invention is to provide a pure synthetic glucuronic acid.

Another object is to provide processes of the above type which result in exceptionally high yields of the desired end products.

Another object of the invention is to provide a process for producing ethyl glucoside, in a novel physical form peculiarly suited for use in the production of glucuronic acid or compounds thereof.

Another object of the invention is to provide an improved method of oxidizing only the free primary alcohol group on the molecule of a glucose compound having one or more such groups.

Another object of the invention is to provide a simple method of producing edible glucuronates.

Other objects and advantages of the invention will appear from the following specification and the appended claims.

The preferred process for producing a pure crystalline glucuronic acid hereinafter described may be applied to any glucose compound having a free primary alcohol group, provided the aldehyde group on the molecule is coupled with a substance which will protect it against oxidization. Examples of such materials are ethyl glucoside, methyl glucoside and polymerized glucose compounds such as edible cornstarch and glycogen. However, polymers such as starch give a lower yield and, therefore, the simple (non-polymerized) compounds are preferred.

Other glucose materials having several aldehyde groups, only a portion of which are protected, may be used. Such materials include maltose which has one protected aldehyde group and one free aldehyde group. However, these too are less desirable because they give lower yields.

For purposes of the present specification, the class of glucose compounds which may be utilized may be defined as those having a free primary alcohol group and a protected aldehyde group.

Best results have been achieved using ethyl glucoside; and among the features of the invention are a novel physical form of ethyl glucoside and a method of producing it at low cost and in substantial quantities. This material is not only well suited for use in producing pure glucuronic acid because of the high yields which result, but it is peculiarly suited for use in a simplified version of the process which may be employed to produce slightly impure but edible water soluble glucuronates. Accordingly, the process utilized to obtain ethyl glucoside will be described first.

The preferred method involves as its initial step the combining of ethyl alcohol with glucose by any standard procedure. The usual practice is to boil anhydrous glucose in absolute ethyl alcohol containing dry hydrochloric acid gas for a sufficient period to cause a substantially complete extinction of the reducing power of the compound. At atmospheric pressure, this will usually require from four to five days. An acid-proof container having a reflux condenser protected by a drying tube is employed. The hydrochloric acid and the drying tube are required to keep the material in an anhydrous form since the presence of water prevents the reaction from going to completion.

Instead of attempting to isolate pure ethyl glucoside from the resulting liquid, the liquid, in accordance with the present invention, is decolorized by activated charcoal to remove the small amount of caramelized glucose which is formed and is then vacuum distilled until a dry foamy mass is obtained. This material is almost pure ethyl glucoside in an amorphous anhydrous form. The vacuum distillation is carried out at a temperature between 50° C. and 80° C. The initial pressure should not be so low as to cause excessive foaming. A batch containing two pounds of glucose will require distillation for from 12–18 hours at from 50 to 70° C., if the final pressure is from 9 to 20 mm. The material is thought to be amorphous in character due to the presence of both alpha and beta forms of ethyl glucoside.

The above described method constitutes a simple and practical way to produce ethyl glucoside in large quantities in a form which may be readily handled. The yield is approximately 100% since the weight of the final product is approximately that of the initial glucose used. The product is of sufficient purity to constitute an exceptionally good source of glucuronic acid or glucuronates however derived, and hence may constitute an article of commerce capable of use for a number of purposes. However, it should be protected from the atmosphere and moisture since it is hygroscopic. Such protection is particularly required if the material is to be oxidized in the manner hereinafter described.

In lieu of the above described vacuum distillation of the ethyl glucoside, the material may be dehydrated by spraying it in atomized form into a moving column of warm, dry gas or air. This is advantageous where large quantities are to be dehydrated because of the difficulty of removing all moisture by vacuum distillation in the case of large batches.

The first step in the process of treating a selected glucose compound of the class described is to oxidize the compound by exposing it to nitrogen dioxide in any desired way. However, since the glucose compounds which are best suited for use in the process take up water from the reaction and form heavy gummy masses in the early stages of the oxidizing process, it is necessary to forcibly mix the nitrogen dioxide and the glucose compound. This could be done mechanically but is preferably done by forcing small bubbles of nitrogen dioxide gas up through the mass.

One satisfactory method of causing bubbles of nitrogen dioxide gas to pass through the mass is to float the mass on a solvent for nitrogen dioxide in which solvent liquid nitrogen dioxide is dissolved. Carbon disulphide or chloroform may be used as the solvent, but the latter is preferred. When this practice is followed, the nitrogen dioxide slowly volatilizes and builds up sufficient pressure to force its way through the floating mass. The material is kept cool during the process to prevent excessive vaporization of the nitrogen dioxide and also to prevent destruction of the molecules of the glucose compound. One representative example of the process is as follows:

A flask is charged with 6600 cc. of liquid chloroform and 950 grams of the above described anhydrous amorphous ethyl glucoside is then stirred into the liquid to disperse it as much as possible. A solution of 600 cc. of chloroform and 374 cc. of nitrogen dioxide is then added. The flask is maintained at a temperature of about 20° C. for seven to eight days or until the reaction is complete. A vent is provided for the escape of nitrogen dioxide during the process.

Upon completion of the reaction, the remaining chloroform and nitrogen dioxide is decanted and the residual material is subject to a vacuum at room temperature until the brown nitrogen dioxide gas ceases to evolve. For this purpose, a pressure of 20 mm. is satisfactory. The residual material which is in the form of a gummy mass, is then dissolved in about one half its weight of absolute ethyl alcohol and vacuum distilled to remove all volatile ingredients at a temperature of about 50° C. and pressure of 20 mm. or less. At this stage, heat injures the product and, therefore, the vacuum should be as high as possible and the temperature as low as possible so long as the temperature is not so low as to unduly prolong the distillation process. The resulting product is between 80 and 100% ethyl glucuronide in the form of a practically dry foam.

The same procedure may be employed using edible cornstarch instead of ethyl glucoside, but the yield of glucuronic acid is only about 10 to 20%. Other glucose compounds of the class mentioned may also be used with comparable results. In any case, the result of this portion of the process is to convert each free primary alcohol group on the molecule to a carboxyl group.

There are two methods of treating the oxidized glucose compounds to produce two different end products. Thus an edible glucuronate may be produced in the following manner from ethyl glucuronide:

The ethyl glucuronide is hydrolyzed in a dilute mineral acid solution to produce glucuronic acid. While either sulphuric or hydrochloric acid might be used, sulphuric acid is preferred because it is less destructive to the glucose compound. For example, a one percent sulphuric acid solution to which has been added the ethyl glucuronide, is maintained at an elevated temperature for fifteen to twenty-four hours or until the ethyl alcohol has been completely volatilized and driven off. Since high temperatures and prolonged heating result in decomposition, the temperature should be kept as low as possible without unduly prolonging the time required to complete the operation. A temperature of 85° C. at atmospheric pressure gives satisfactory results.

After the ethyl alcohol is driven off, the sulphuric acid is neutralized by a base which will produce an insoluble sulphate. Thereafter, the glucuronic acid is neutralized by a suitable base. The resulting product is a water solution of a glucuronate and a precipitate of the insoluble sulphate which can be removed by filtration. Calcium or barium hydroxides and carbonates will produce an insoluble sulphate, and hence may be used to neutralize the sulphuric acid. The preferred neutralization procedure is as follows (for sulphuric acid):

The sulphuric acid in the mixture is neutralized either partly or wholly by calcium hydroxide, complete neutralization of the solution being avoided to prevent accidental over-stepping of the end point, since glucuronic acid decomposes in an alkali solution. Neutralization of any residual sulphuric acid is completed by calcium carbonate which is insoluble in water and hence cannot produce an alkaline solution that would injure the glucuronic acid, even if it is added in excess.

The glucuronic acid is then neutralized by adding magnesium carbonate, calcium carbonate, potassium carbonate or sodium carbonate to produce a glucuronate of the metal from the carbonate employed. The use of carbonates alone for neutralizing both the mineral acid and the glucuronic acid results in a higher yield of glucuronate but causes objectional foaming.

The neutralized material is filtered to remove the sulphate and the filtrate comprises glucuronate in a water solution. The solution is not entirely pure, but the yield of glucuronate is high and the principal adulterant is caramelized glucose which gives it a brownish color but is an edible material. Two pounds of anhydrous glucose produce approximately one and a half pounds of glucuronate by this method.

If hydrochloric acid is used to hydrolyze the oxidized glucose compound, the hydrochloric acid may be neutralized by any of the above mentioned materials to produce a chloride which remains in the solution, or with a base such as silver carbonate which will produce an insoluble chloride.

If greater purity is desired than that which can be obtained by the above processes, the hydrolyzate may be treated with barbituric acid to condense furfuraldehyde and may be decolorized with activated charcoal, both treatments being carried out prior to neutralization. These steps are preferably carried out as follows:

The hydrolyzate is analyzed for furfuraldehyde and the calculated amount of barbituric acid required to combine with the furfuraldehyde is added to the hot hydrolyzate. The material is allowed to stand for a sufficient period to permit condensation of furfuraldehyde-barbituric acid compound. The material is then warmed, treated with activated charcoal and filtered. The clear filtrate is then neutralized in the manner described above. When these purification steps are employed, the sulphuric acid may be neutralized with barium carbonate or calcium carbonate since less foaming occurs on neutralization of the purified material. The resulting product is a water solution of a glucuronate of the metal of the carbonate employed in the neutralization of the glucuronic acid plus minor impurities.

Barbituric acid is preferred as the condensation product for use in the above process because small quantities have no harmful effect on the body and, consequently, no danger exists if the barbituric acid is not entirely removed. Moreover, it is a sedative and it is usually necessary to take a sedative with any dosage of glucuronic acid or glucuronate. Barbituric acid salts or substituted barbituric acids, such as diethyl barbituric acid may also be used.

The glucuronate solutions produced by the above described processes may be used in that form but since glucuronates in water solutions are somewhat unstable, they have poor keeping qualities. Therefore, it is preferred to dehydrate the solution by injecting it in atomized form into a warm current of dry gas or air to produce an anhydrous powder which has excellent keeping qualities if kept in a closed container.

If an edible glucuronate is desired, the above described process, either with or without the added purifying steps, is preferably applied to a simple (non-polymerized) glucose compound since the polymerized compounds such as starch produce a product of less purity. Ethyl glucoside is the preferred starting compound because of the non-toxic character of ethyl alcohol, and the very high yields of glucuronate which results from its use.

Pure crystalline glucuronic acid, or water soluble salts thereof, may be produced in accordance with the present invention from any oxidized glucose compound of the class described (such as ethyl or methyl glucuronide, oxidized starch, oxidized glycogen, etc.) by the following process:

The oxidized material is hydrolyzed in a dilute sulphuric acid solution as above described. In the case of ethyl or methyl glucuronide or similar compounds, the hydrolysis must be continued until all alcohol is evaporated. In the case of polymers, such as oxidized starch, the separation of the glucuronic acid takes place immediately. In either case, it is found that the material contains a small quantity of furfuraldehyde created by breakage of the glucose molecules and that the furfuraldehyde interferes with subsequent isolation of glucuronic acid. Accordingly, the furfuraldehyde is condensed by adding any suitable agent to the hydrolyzed material. The preferred agent for use in condensing the furfuraldehyde is barbituric acid which is added to the hydrolyzate at the end of the hydrolyzing process and while the material is still hot. The amount required may be calculated from an analysis of the hydrolyzate, but since an excess of barbituric acid is not objectionable in this process, an arbitrary addition of an amount in the order of 1% of the total batch may be made. Thereafter, the solution is allowed to stand for a sufficient period for the condensation reaction to reach completion. Since the latter steps in the process result in the removal of impurities, the danger of any residual condensation agent remaining in the product is slight. Therefore, other well known condensation agents, such as phenols, may be used in spite of their poisonous character.

On completion of the condensation reaction, the material is warmed and activated charcoal added to decolorize. The condensation product and charcoal are then removed by filtration.

The clear filtrate, which consists primarily of a water solution of glucuronic acid and sulphuric acid, is then completely neutralized with barium carbonate to produce barium sulphate and barium glucuronate plus minor impurities. The use of barium bases for neutralization at this stage of the process is essential if the hydrolyzing acid is sulphuric because barium sulphate is almost entirely insoluble in water (whereas calcium sulphate is slightly soluble). The use of mild barium bases, such as barium carbonate, is preferred because they have no injurious effect upon the glucose compound. Nevertheless, if desired, the sulphuric acid may be partially neutralized by barium hydroxide and then completely neutralized by the barium carbonate in the manner previously described. In either event, the precipitated barium sulphate plus any excess of barium carbonate is removed from the solution by filtration leaving substantially pure barium glucuronate in solution.

If hydrochloric acid is used to hydrolyze the oxidized glucose compound, then the hydrochloric acid may be neutralized by silver carbonate to precipitate silver chloride, which is removed during the above mentioned filtration.

Prior attempts to extract glucuronic acid compounds from water solutions have been unsuccessful partially because of the presence of such impurities as furfuraldehyde and such compounds as are removed in the present process by activated charcoal, but also due to the fact that glucuronic acid compounds are unstable in water solutions and tend to break down during the treatments required for extraction purposes. Consequently, in accordance with the present process, the filtrate produced in the manner described above is completely dehydrated to a dry powder in any desired manner as, for example, by high vacuum dehydrating equipment or by the use of the type of equipment employed in the manufacturing of powdered milk in which an atomized spray of the solution is injected into a current of warm dry gas or air. It is highly desirable that the dehydration take place in as short a time as possible and at as low a temperature as possible. The resulting barium glucuronate and minor impurities in the form of a dry powder, is then washed in absolute ethyl alcohol to remove all soluble materials. The residual material, which is preferably extracted from the alcohol by filtration, is pure barium glucuronate.

The barium glucuronate is dried and accurately weighed and the calculated amount of sulphuric acid is then added with as little water as possible to free the glucuronic acid by formation of barium sulphate. The solution is then poured into absolute ethyl alcohol to precipitate the barium sulphate and any residual barium glucuronate and the precipitates are removed by filtration. The resulting filtrate is a solution of pure glucuronic acid in absolute alcohol. This solution is concentrated by vacuum distillation at a relatively low temperature and the concentrated solution then placed in a vacuum desiccator at room temperature and held until the glucuronic acid crystallizes out. If desired, seeding of the concentrated solution by crystals of glucuronic acid may be employed to accelerate the process at this stage.

Any desired pure compounds may, of course, be produced from the pure glucuronic acid. Thus, for example, pure water soluble glucuronates may be made by neutralizing the acid with carbonates of sodium, potassium, calcium or magnesium.

Variations in the detailed steps described above and substitution of equivalent reagents for producing the reactions required in the above described processes may be made in accordance with known principles without departing from the spirit of the invention or the scope of the appended claims.

What is claimed is:

1. In a method of producing glucuronic acid or a compound thereof, wherein furfuraldehyde is produced, the steps which include subjecting a glucose compound having a free primary alcohol group and a protected aldehyde group to the action of nitrogen dioxide at a temperature not substantially in excess of 20° C. to convert the alcohol group to a carboxyl group, separating glucuronic acid in solution by hydrolyzing the oxidized material in a weak solution of a mineral acid, combining the hydrolyzate with a small quantity of a condensation agent for furfuraldehyde, neutralizing the mineral acid, and filtering to remove the precipitate.

2. In a method of producing glucuronic acid or a compound thereof, wherein furfuraldehyde is produced, the steps which include subjecting a glucose compound having a free primary alcohol group and a protected aldehyde group to the action of nitrogen dioxide at a temperature not substantially in excess of 20° C. to convert the alcohol group to a carboxyl group, separating glucuronic acid in solution by hydrolizing the oxidized material in a weak solution of a mineral acid, combining the hydrolyzate with a small quantity of barbituric acid to condense furfuraldehyde, neutralizing the mineral acid, and filtering the material to remove all precipitate.

3. In a method of producing glucuronic acid or a compound thereof, wherein furfuraldehyde is produced, the steps which include subjecting a glucose compound having a free primary alcohol group and a protected aldehyde group to the action of nitrogen dioxide at a temperature not substantially in excess of 20° C. to convert the alcohol group to a carboxyl group, separating glucuronic acid in solution by hydrolyzing the oxidized material in a weak solution of a mineral acid, combining the hydrolyzate with a small quantity of a condensation agent for furfuraldehyde, precipitating the mineral acid as an insoluble salt, filtering to remove the precipitate, neutralizing the glucuronic acid to a water soluble glucuronate, and precipitating the pure glucuronate in absolute alcohol.

4. The method of producing glucuronic acid or a compound thereof which includes subjecting a glucose compound having a free primary alcohol group and a protected aldehyde group to the action of nitrogen dioxide at a temperature not substantially in excess of 20° C. to convert the alcohol group to a carboxyl group, separating glucuronic acid in solution by hydrolyzing the oxidized material in a weak solution of a mineral acid, combining the hydrolyzate with a small quantity of barbituric acid, precipitating the mineral acid as an insoluble salt, filtering the material to remove all precipitate, neutralizing the glucuronic acid to a water soluble glucuronate, and precipitating the glucuronate in absolute alcohol.

5. The method of producing glucuronic acid or a compound thereof which includes subjecting a glucose compound having a free primary alcohol group and a protected aldehyde group to the action of nitrogen dioxide at a temperature not substantially in excess of 20° C. to convert the alcohol group to a carboxyl group, separating glucuronic acid in solution by hydrolyzing the oxidized material in a weak solution of a mineral acid, combining the hydrolyzate with a small quantity of barbituric acid, precipitating the mineral acid as an insoluble salt, filtering the material to remove all precipitate, neutralizing the glucuronic acid to a water soluble glucuronate, precipitating the pure glucuronate in absolute alcohol, and extracting pure glucuronic acid from said glucuronate.

6. In a method of producing glucuronic acid or a compound thereof, wherein furfuraldehyde is produced, the steps which include subjecting a glucose compound having a free primary alcohol group and a protected aldehyde group to the action of nitrogen dioxide at a temperature not substantially in excess of 20° C. to convert the alcohol group to a carboxyl group, separating glucuronic acid in solution by hydrolyzing the oxidized material in a weak solution of sulphuric acid, combining the hydrolyzate with a small quantity of a condensation agent for furfuraldehyde, precipitating the sulphuric acid as barium sulphate, filtering to remove the condensation compound and the barium sulphate, neutralizing the glucuronic acid by barium carbonate, precipitating the pure barium glucuronate in alcohol, removing the precipitate by filtration, reacting the precipitate with a solution of sulphuric acid to form barium sulphate, removing the precipitated barium sulphate by filtration, and evaporating the filtrate to crystallize out the glucuronic acid.

7. The method of producing glucuronic acid or a compound thereof which includes subjecting a glucose compound having a free primary alcohol group and a protected aldehyde group to the action of nitrogen dioxide at a temperature not substantially in excess of 20° C. to convert the alcohol group to a carboxyl group, separating glucuronic acid in solution by hydrolyzing the oxidized material in a weak solution of sulphuric acid, combining the hydrolyzate with a small quantity of barbituric acid, precipitating the sulphuric acid as barium sulphate, filtering the material to remove all precipitate, neutralizing the glucuronic acid by barium carbonate, precipitating the pure barium glucuronate in alcohol, removing the precipitate by filtration, reacting the precipitate with a solution of sulphuric acid to form barium sulphate, removing the precipitated barium sulphate by filtration, and evaporating the filtrate to crystallize out the glucuronic acid.

8. The method set forth in claim 1 with the added step of decolorizing the hydrolyzate with activated charcoal, prior to neutralization thereof.

9. The method set forth in claim 2 with the added step of decolorizing the hydrolyzate with activated charcoal prior to neutralization thereof.

10. The method set forth in claim 3 with the added step of decolorizing the hydrolyzate with activated charcoal prior to neutralization thereof.

11. The method set forth in claim 4 with the added step of decolorizing the hydrolyzate with activated charcoal prior to neutralization thereof.

12. The method set forth in claim 5 with the added step of decolorizing the hydrolyzate with activated charcoal prior to neutralization thereof.

13. The method set forth in claim 6 with the added step of decolorizing the hydrolyzate with activated charcoal prior to neutralization thereof.

14. The method set forth in claim 7 with the added step of decolorizing the hydrolyzate with activated charcoal prior to neutralization thereof.

EARL A. PETERMAN.

REFERENCES CITED

The following references are of record in the file of this patent:

UNITED STATES PATENTS

| Number | Name | Date |
| --- | --- | --- |
| 2,028,141 | Ackermann | Jan. 21, 1936 |
| 2,276,621 | Langlois | Mar. 17, 1942 |
| 2,318,500 | King et al. | May 4, 1943 |

OTHER REFERENCES

Maurer et al., Ber. Deut. Chem. Gesel., vol. 75, pages 1490–1491 (1942).

Karrer, "Organic Chemistry," page 314, Elsevier Pub. Co., N. Y., (1946).